United States Patent [19]
Angliker et al.

[11] 3,971,771
[45] July 27, 1976

[54] MONOAZO COMPOUNDS

[75] Inventors: Hans-Joerg Angliker; Richard Peter, both of Basel, Switzerland

[73] Assignee: Ciba-Geigy AG, Basel, Switzerland

[22] Filed: Apr. 10, 1974

[21] Appl. No.: 459,518

Related U.S. Application Data

[63] Continuation of Ser. No. 195,492, Nov. 3, 1971, abandoned.

[30] Foreign Application Priority Data

Nov. 11, 1970 Switzerland...................... 16658/70

[52] U.S. Cl................................ 260/207; 260/152; 260/153; 260/154; 260/156; 260/157; 260/158; 260/162; 260/155; 260/187; 260/201; 260/207.1
[51] Int. Cl.$^2$.................... C09B 29/08; C09B 29/26
[58] Field of Search........................ 260/207, 207.1

[56] References Cited
UNITED STATES PATENTS

| | | | |
|---|---|---|---|
| 3,158,595 | 11/1964 | Green et al. | 260/207 X |
| 3,337,522 | 5/1967 | Wegmuller et al. | 260/207 X |
| 3,510,470 | 5/1970 | Dickey et al. | 260/207 X |
| 3,558,593 | 1/1971 | Lindner et al. | 260/207.1 |
| 3,592,807 | 7/1971 | Von Brachel | 260/207.1 |

FOREIGN PATENTS OR APPLICATIONS

| | | | |
|---|---|---|---|
| 1,466,675 | 12/1966 | France | 260/207.1 |
| 1,067,040 | 4/1967 | United Kingdom | 260/207.1 |
| 1,172,154 | 10/1969 | United Kingdom | 260/207.1 |
| 1,175,138 | 12/1967 | United Kingdom | 260/207.1 |

*Primary Examiner*—Charles F. Warren
*Attorney, Agent, or Firm*—Joseph G. Kolodny; Prabodh I. Almaula; Edward McC. Roberts

[57] ABSTRACT

Disperse azo dyestuffs of the formula

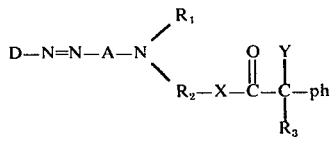

where
D is the residue of a diazo component of the benzene series,
A is the residue of a coupling component of the aminobenzene series,
$R_1$ is alkyl, which can be substituted, e.g. by CN, Cl, OH, alkoxy, etc.,
$R_2$ is preferably alkylene,
X is —NH—, —O— or —S—,
Y is preferably halogen, alkoxy, acyloxy, alkylcarbonyldioxy or alkylcarbamyloxy,
$R_3$ and ph are phenyl which can be substituted by nitro, halogen, alkyl or alkoxy and $R_3$ can be H, dye polyester fibers in yellow, red or blue shades with good general fastness properties.

5 Claims, No Drawings

MONOAZO COMPOUNDS

This is a continuation of application Ser. No. 195,492, filed on Nov. 3, 1971 and now abandoned.

The invention relates to valuable new azo compounds which are free from sulpho groups and have the formula

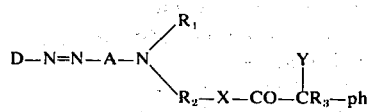

wherein D is the radical of a diazo component, A is an optionally substituted 1,4-phenylene radical, $R_2$ is an optionally substituted alkylene radical, X is an imino group, a sulphur atom or preferably an oxygen atom, Y is a halogen atom, preferably a chlorine atom, an acyloxy, alkoxy or aryloxy radical, ph is an optionally substituted phenyl radical, $R_1$ is an optionally substituted alkyl radical or a radical of the formula

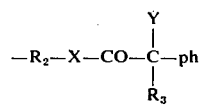

and $R_3$ is an optionally substituted phenyl radical or a hydrogen atom.

According to the invention, the compounds are obtained (a) by coupling a diazonium compound of a diazo component with a coupling component of the formula

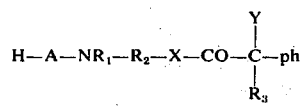

in which A, $R_1$, $R_2$, $R_3$, ph, X and Y have the same meanings as given above, or (b) condensing an azo compound of the formula $$D-N=N-A-NR_1'-R_2-X-H$$

in which $R_1'$ is an optionally substituted alkyl group or a radical of the formula $-R_2-X-H$ and D has the same meaning as given above, with monohalides of the formula

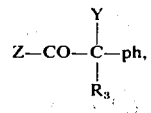

in which Z is a halogen atom, preferably a chlorine atom, and (c) optionally treating with quaternising agents.

Interest attaches to compounds which are free from acid group and have the formula

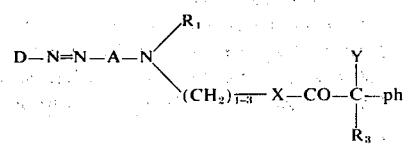

and

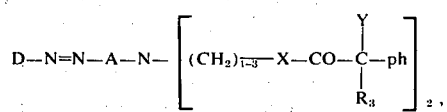

in which D, A, X, ph, $R_3$ and Y have the same meanings as above.

The compounds of the formula

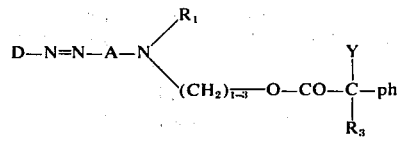

and

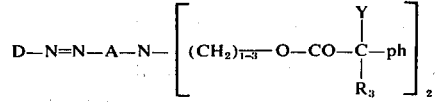

in which D, A, $R_1$, $R_3$, ph and Y have the same meanings as above.

The group A advantageously corresponds to the formula

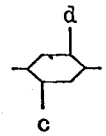

wherein c is in the ortho-position to the azo group and d is in the ortho-position to the amino group.

The radicals c and d represent hydrogen atoms, chlorine atoms, lower alkyl or alkoxy radicals, such as the methyl, ethyl, methoxy or ethoxy radical, and also phenylthio or phenoxy radicals.

The radical c can additionally also represent a bromine atom, a trifluoromethyl group and an acylamino group which is optionally alkylated, preferably methylated, at the nitrogen atom, and in which the acyl radical is the radical of a carboxylic acid, such as a formyl, acetyl, propionyl, butyryl or benzoyl radical, the radical of an organic monosulphonic acid, such as methanesulphonic, ethanesulphonic or p-toluenemonosulphonic acid radical, or the radical of a carbonic acid monoester or monoamide, such as a methoxycarbonyl, phenoxycarbonyl, aminocarbonyl, butylaminocarbonyl or phenylamino carbonyl radical.

The group $R_1$ can represent an alkyl group with nine carbon atoms which may be substituted and/or interrupted by oxygen. As examples there may be mentioned: The β-chloroethyl, β, β, β-trifluoroethyl, β,γ-dichloropropyl, benzyl, β-phenylethyl, β-cyanoethyl, alkoxyalkyl, such as β-ethoxyethyl or γ-butyloxybutyl, hydroxyalkyl, for example β-hydroxyethyl, β-γ-dihydroxypropyl, carbalkoxy, for example β-carbo-(methoxy-,ethoxy-, or propoxy, penthyloxy- or decyloxy)-ethyl (it being possible for the terminal alkyl group to carry cyano, carbolkoxy and alkoxy groups, β- or γ-carbol (methoxy- or ethoxy)-propyl, acylaminoalkyl, for example β-(acetyl- or formyl)-aminoethyl, benzoylaminoethyl, dodecylaminoethyl, acyloxyalkyl, for example β-acetyloxyethyl, β, γ-diacetoxypropyl, γ- butyloxybutyl, benzoyloxyethyl, decylcarbonyloxyethyl, dodecylcarbonyloxyethyl and their chlorinated $C_1$–$C_5$ derivatives, such as chloroacetyloxyethyl and $\alpha,\beta$-dibromopropionyloxyethyl, $\beta$-alkylsulphonylalkyl, for example $\beta$-methanesulphonylethyl, $\beta$-ethanesulphonylethyl, alkyl- or arylcarbamoyloxyalkyl, such as $\beta$-methylcarbamyloxyethyl, phenylcarbamyloxy, butylcarbamyloxy, dodecylcarbamyloxy, alkyloxy-carbonyloxyalkyl, for example $\beta$-(methoxy-, ethoxy- or isopropyloxy)-carbonylethyl, cinnamoyloxyethyl, thiophenecarbonyloxyethyl, pyridinecarbonyloxy, vinylsulphonylethyl, $\beta$-$\beta'$-(cyano-, hydroxy-, methoxy- or acetoxy)-ethoxycarbonyl-ethyl, cyanoalkoxyalkyl, $\beta$-carboxyethyl, $\beta$-acetylethyl, $\beta$-diethylaminoethyl, $\beta$-cyanacetoxyethyl, $\beta$-benzoyloxyethyl or $\beta$-(p-alkoxy- or phenoxybenzoyloxy)ethyl group. The group $R_1$ contains in general up to 8 carbon atoms. The term "lower alkyl group" denotes preferably methyl, ethyl, propyl or butyl groups.

As examples of alkylene radicals $R_2$, the following may be mentioned (the terminal amino group of the azo dye-stuff also being shown, in order to characterise the position):

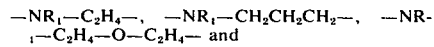, 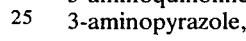, —NR$_1$—C$_2$H$_4$—O—C$_2$H$_4$— and

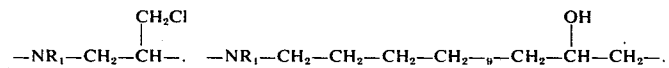

The radical Y can be an alkyl- or arylcarbonyloxy group, for example an acetoxy, formyloxy, butyryloxy, benzoyloxy, decylcarbonyloxy or dodecylcarbonyloxy group, alkyl- or arylcarbamoyloxy groups, such as an ethylcarbamoyloxy, butylcarbamoyloxy or phenylcarbamoyloxy group, or an alkyl- or aryloxycarbonyloxy group, for example a methyloxycarbonyloxy, ethoxycarbonyloxy, butoxycarbonyloxy, phenoxycarbonyloxy or p-toluyloxycarbonyloxy group. The radical Y can further denote an alkoxy or aryloxy group, for example a methoxy, ethoxy, phenoxy, butoxy, p-methylphenoxy or p-chlorophenoxy group.

The diazo radical D is principally derived from monocyclic or bicyclic amines of the formula

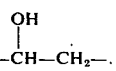

such as any diazotisable amines which contain no acid substituents which impart solubility in water, but especially of amines which possess a heterocyclic five-membered ring with 2 or 3 hetero-atoms, above all one nitrogen atom and one or two sulphur, oxygen or nitrogen atoms as hetero-atoms, and aminobenzenes, above all negatively substituted aminobenzenes, especially those of the formula

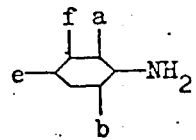

wherein $a$ denotes a hydrogen or halogen atom, or an alkyl or alkoxy, nitro, nitrile, carbalkoxy or alkylsulphone group, $b$ denotes a hydrogen or halogen atom or an alkyl, nitrile or trifluoromethyl group, $e$ denotes a nitro, nitrile, carbalkoxy or alkylsulphonyl group and $f$ denotes a hydrogen or halogen atom or a carbalkoxy or carboxylic acid amide group. "Negative substituents" have a positive sigma$_{para}$-value.

As example there may be mentioned: 2-aminothiazole, 2-amino-5-nitrothiazole, 2-amino-5-methylsulphonylthiazole, 2-amino-5-cyanothiazole, 2-amino-4-methyl-5-nitrothiazole,
3-amino-5-nitro-benzisothiazole,
3-amino-5-nitro-7-bromo-benzisothiazole,
3-amino-benzisothiazole,
3-amino-5chloro-benzisothiazole,
3-amino-7-chloro-benzisothiazole,
3-amino-4chloro-benzisothiazole,
3-amino-5,7-dichloro-benzisothiazole,
3-amino-5-chloro-7-bromo-benzisothiazole,
3-amino-6-methyl-benzisothiazole,
3-amino-5,7-dibromo-benzisothiazole,
2-amino-4-methylthiazole,
2-amino-4-phenylthiazole,
2-amino-4-(4'-chloro)-phenylthiazole,
2-amino-4-(4'-nitro)-phenylthiazole,
3-aminopyridine,
3-aminoquinoline,
3-aminopyrazole,
3-amino-1-phenylpyrazole,
3-aminoindazole,
3-amino-1,2,4-triazole,
5-(methyl-, ethyl-, phenyl- or benzyl)-1,2,4-triazole,
3-amino-1-(4'-methoxyphenyl)-pyrazole,
2-aminobenzthiazole,
2-amino-6-methylbenzthiazole,
2-amino-6-methoxybenzthiazole,
2-amino-6-chlorobenzthiazole,
2-amino-6-cyanobenzthiazole,
2-amino-6-thiocyanobenzthiazole,
2-amino-6-nitrobenzthiazole,
2-amino-6-carboethoxybenzthiazole,
2-amino-(4- or 6)-methylsulphonylbenzthiazole,
2amino-1,3,4-thiadiazole,
2-amino-1,3,5-thiadiazole,
2-amino-4-phenyl- or 4-methyl-1,3,5-thiadiazole,
2-amino-5-phenyl-1,3,4-thiadiazole,
2-amino-3-nitro-5-methylsulphonyl-thiophene,
2-amino-3,5-bis-(methylsulphonyl)-thiophene,
5-amino-3-methyl-isothiazole,
2-amino-4-cyano-pyrazole,
2-(4'-nitrophenyl)-3-amino-4-cyanopyrazole,
3- or 4-aminophthalimide,
aminobenzene,
1-amino-2-trifluoromethyl-4-chlorobenzene,
1-amino-2cyano-4-chlorobenzene,
1-amino-2-carbomethoxy-4-chlorobenzene,
1-amino-2-carbomethoxy-4-nitrobenzene,
1-amino-2-chloro-4-cyanobenzene,
1-amino-2-chloro-4-nitrobenzene,
1-amino-2-bromo-4-nitrobenzene,
1-amino-2-chloro-4-carbethoxybenzene,
1amino-2-chloro-4-methylsulphonylbenzene,
1-amino-2-methylsulphonyl-4-chlorobenzene,
1-amino-2,4-dinitro-6-methylsulphonylbenzene,
1-amino-2,4-dinitro-6-(2'-hydroxyethylsulphonyl)-benzene, 1-amino-2,4-dinitro-6-(2'-chloroethylsulphonyl)-benzene,
1-amino-2-methylsulphonyl-4-nitrobenzene,
1-amino-2,4-dinitrobenzene,
1-amino-2,4-dicyanobenzene,
1amino-2-cyano-4-methylsulphonylbenzene,
1-amino-2,6-dichloro-4-cyanbenzene,
2-cyano-4-chloroaniline,
2-cyano-4-chloro-6-bromaniline,
2-cyano-4,6-dibromaniline,
1-amino-2,6-dichloro-4nitrobenzene,
1-amino-2,4-dicyano-6-chlorobenzene,
4-amino-benzoic acid cyclohexyl ester,
1-amino-2,4-dinitro-6-chlorobenzene and especially
1-amino-2-cyano-4-nitrobenzene, also
1-aminobenzene-2-, -3- or -4-sulphonic acid amide, such as N-methyl- or N,N-dimethyl- or -diethylamide,
N,γ-isopropyloxypropyl-2-aminonaphthalene-6-sulphonic acid amide,
N,γ-isopropyloxypropyl-1-aminobenzene-2-, -3- or -4-sulphonic acid amide,
N-isopropyl-1-aminobenzene-2-, -3- or -4- sulphonic acid amide,
N,γ-methoxypropyl-1-aminobenzene-2-, -3- or -4- sulphonic acid amide,
N,N-bis-(62 -hydroxyethyl)-1-aminobenzene-2-, -3- or -4-sulphonic acid amide,
1-amino-4-chlorobenzene-2-sulphonic acid amide, and the N-substituted derivatives
2-, 3- or 4-aminophenylsulphamate,
2-amino-4-, -5- or -6-methylphenylsulphamate,
2-amino-5-methoxy-phenylsulphamate.
3-amino-6-chlorophenylsulphamate,
3-amino-2,6-dichlorophenylsulphamate,
4-amino-2- or -3-methoxyphenylsulphamate, N,N-dimethyl-2-aminophenylsulphamate,
N,N-di-n-butyl-2-aminophenylsulphamate,
N,N-dimethyl-2-amino-4-chlorophenylsulphamate,
N,n-propyl-3-aminophenylsulphamate,
N,N-di-n-butyl-3-aminophenylsulphamate,
O(3-aminophenyl)-N-morpholino-N-sulphonate,
O(3-aminophenyl)-N-piperidine-sulphonate,
N-cyclohexyl-O-(3-aminophenyl) -sulphamate,
N(N-methylaniline)-O-(3-aminophenyl)-sulphomate,
N,N-diethyl-3-amino-6-methylphenyl-sulphamate,
N-ethylenimine-O-(4-aminophenyl)-sulphonate,
N,N-dimethyl-4aminophenylsulphamate,
O-(n-propyl)-O-(3-aminophenyl)-sulphonate,
O,β-chloroethyl-O-(2-aminophenyl)-sulphonate,
O-benzyl-O-(3-aminophenyl)-sulphonate and
O-ethyl-O-(4-amino-2,6-dimethyl-phenyl) -sulphonate,
4-aminoazobenzene,
3,2-dimethyl-4-aminoazobenzene,
2-methyl-5-methoxy-4-aminoazobenzene,
4-amino-2-nitroazobenzene,
2,5-dimethoxy-4-aminoazobenzene,
4'-methoxy-4-aminoazobenzene,
2-methyl-4'-methoxy-4-aminoazobenzene,
3,6,4'-trimethoxy-4-aminoazonenzene,
4'-chloro-4-aminoazobenzene,
2'- or 3'-chloro-4-aminoazobenzene,
3-nitro-4-amino-2', 4'-dichloroazobenzene and
4-aminoazobenzene-4'-sulphonic acid amide.
Instead of the above cited diazo components that are ee from ionogenic water-solubilising groups, it is also possible to use those that contain fibre reactive groups such, for example, as s-triazinyl radicals that carry 1 or 2 chlorine or bromine atoms on the triazine ring, pyrimidyl radicals that carry 1 or 2 arylsulphonyl or alkanesulphonyl groups on the pyrimidine ring, mono-, or bis-(γ-halogeno-β-hydroxypropyl)-amino groups, β-halogeno-ethylsulphamyl radicals, β-halogeno-ethoxy groups, β-halogeno-ethylmercapto groups, 2-chloro-benzthiazolyl-6-azo groups, 2chlorobenzthiazolyl-6-amino groups, γ-halogeno-β-hydroxy-propylsulphamyl radicals, chloroacetylamino groups, α,β-dibromopropionyl groups, vinylsulphonyl groups and 2,3-epoxypropyl groups.

Suitable fibre reactive diazo components are, for example:
N,β-chloroethyl-3-chloro-4-amino-benzenesulphamide (hydrochloride),
N,β-chloroethyl-4-aminobenzene-sulphamide (hydrochloride) 3-bromo-4-amino-ωchloroacetophenone,
N,γ-chloro-β-hydroxypropyl-4-aminobenzene-sulphamide,
N,β-chloroethyl-1-amino-4-naphthylsulphonamide,
N,β-chloroethyl-1-amino-3,5-dichloro-benzenesulphamide and
4-(γ-chloro-β-hydroxy-propoxy)aniline.

The diazotisation of the cited diazo components can take place in accordance with the position of the amino group in question, for example with the aid of mineral acid and sodium nitrite or, for example, with a solution of nitrosylsulphuric acid in concentrated sulphuric acid.

The coupling can likewise be carried out in known manner, for example in neutral to acid medium, optionally in the presence of sodium acetate or similar buffer substances or catalysts that influence the coupling speed, for example dimethylformamide, pyridine or its salts.

The coupling components are obtained by acylating amines of the formula

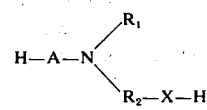

in which A, $R_1$, $R_2$ and X have the same meanings as above, with a carboxylic acid of the formula HOOC—CHY—ph, or its reactive derivatives, such as halides and anhydrides. Suitable acylating agents are, for example:
α-chlorophenylacetic chloride
α-acetylmandelic chloride
benzylic chloride
α-acetylbenzylic chloride.

The required acid chlorides are prepared most simply by treating the corresponding acids with thionyl chloride and small amounts of dimethyl formamide. Chloromandelic chlorides are readily obtainable from the α-hydroxy acids, which on being treated with phosphorus pentachloride lead directly to the α-chloromandelic chlorides. Suitable processes are mentioned in the following literature sources: Liebigs Annalen, vol. 279, page 122; vol. 368, page 59; Organic Syntheses, Collective Volume 1, page 12 (1932); Monatshefte fur Chemie, vol. 53/54, page 488.

Amines of the formula

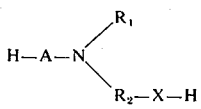

which can be used to the manufacture the coupling component are, for example: N,n-butyl-N-$\beta'$-hydroxyethylaniline, N-methyl-N-$\beta'$-hydroxyethylaniline, N-$\beta$-cyanoethyl-N-$\beta'$-hydroxyethylaniline, N,$\beta$-cyanoethyl-n,$\beta'$-hydroxyethyl-3-chloroaniline, N-ethyl-N,$\beta'$-hydroxyethyl-2-methoxyaniline, N-ethyl-N,$\beta'$-hydroxyethyl-2-methylaniline, N,$\beta$-cyanoethyl-N,$\beta'$-hydroxyethyl-2-acetylamino-aniline, N,$\beta$-($\beta'$-cyanoethoxyethyl)-N,$\beta''$-hydroxyethyl-aniline, N,$\beta$-cyanoethyl-N,$\beta'$-hydroxyethyl-3-methyl-aniline and N,$\gamma$-methylaminopropyl-N-ethylaniline.

Possible monoesters, monoamides and monothioesters are, for example, the monophenyl and monotolyl esters, the N-phenyl- and N-toluyl-monoamides and the toluylthioesters of the abovementioned aliphatic dicarboxylic acids.

Those of the abovementioned heterocyclic diazo components which possess a quaternisable nitrogen atom can also be coupled oxidatively in the N-alkylated form as hydrazones or as azosulphones (compare Angewandte Chemie, volume 70, 215 (1958); volume 74, 818 (1962); volume 80, 343 (1968).

Those amongst the new compounds which contain a quaternised amino group can also be obtained by quaternising the corresponding dyestuffs which contain a non-quaternised amino group, by treatment with alkylating agents.

As such alkylating or quaternising agents it is for example possible to use: esters of strong mineral acids, or of organic sulphonic acids, for example, dimethyl sulphate, diethyl sulphate, alkyl halides, for example methyl chloride, bromide or iodide, aralkyl halides, for example benzyl chloride esters of low molecular alkanesulphonic acids, such as, for example methyl esters of methanesulphonic, ethanesulphonic or butanesulphonic acid, and esters of benzenesulphonic acids, which can possess additional substituents, for example methyl, ethyl, propyl or butyl esters of benzenesulphonic acid; additional suitable quaternising agents are $\alpha,\beta$-unsaturated compounds, for example methacrylic amide, vinylethyl ketone, vinylethyl ether, and above all, acylic amide. These compounds are used together with an acid as proton suppliers, such as pure acetic acid, sulphuric acid or hydrogen chloride. Further quaternising agents are oxonium salts such as, for example, triethyleneoxonium borfluorate.

The alkylation is appropriately carried out by warming in an inert organic solvent, for example hydrocarbons, such as benzene, toluene or xylene, halogenated hydrocarbons, such as carbon tetrachloride, tetrachloroethane, chlorobenzene or o-dichlorobenzene, or nitro-hydrocarbons, such as nitromethane, nitrobenzene or nitronaphthalene. Acid anhydrides, acid amides or nitriles, such as acetic anhydride, dimethylformamide or acetonitrile, or dimethylsulphoxide, can also be used as solvents in the alkylation. Instead of a solvent, a large excess of alkylating agent can also be used. In this case however, care must be taken that the mixture does not become excessively hot, since the reaction is strongly exothermic. Nevertheless it is necessary in most cases, especially in the presence of organic solvents, to warm the reaction mixture externally in order to initiate the reaction. In special cases the alkylation can also be carried out in an aqueous medium or using an alcohol, aptionally in the presence of small amounts of potassium iodide.

If purification of the salts is necessary, it is appropriately effected by dissolving them in water, in which case any unreacted starting dyestuff can be filtered off as an insoluble residue. The dyestuff can be reprecipitated from the aqueous solution by adding water-soluble salts, for example sodium chloride.

The non-quaternised dyestuffs are as a rule insoluble in water.

The new compounds, their mixtures with one another and their mixtures with other azo dyestuffs are outstandingly suitable for dyeing and printing leather, wool, silk and above all synthetic fibres, such as, for example, acrylic or acrylonitrile fibres, polyacrylonitrile fibres and copolymers of acrylonitrile and other vinyl compounds, such as acrylic esters, acrylamides, vinylpyridine, vinyl chloride or vinylidene chloride, copolymers of dicyanoethylene and vinyl acetate as well as acrylonitrile block copolymers, fibres of polyurethanes, polyolefines, such as basic-modified, nickel-modified or unmodified polypropylene, cellulose triacetate and cellulose 2½-acetate and especially fibres of polyamides, such as nylon 6, nylon 6,6 or nylon 12, and of aromatic polyesters, such as those from terephthalic acid and ethylene glycol or 1,4-dimethylcyclohexane, and copolymers of terephthalic acid and isophthalic acid and ethylene glycol.

For dyeing in aqueous liquors, the water-insoluble dyestuffs are appropriately used in a finely divided form, and dyeing is carried out with addition of dispersing agents, such as sulphite cellulose waste lye or synthetic detergents, or of a combination of different wetting agents and dispersing agents. As a rule it is advisable to convert the dyestuffs to be used, before dyeing, into a dyeing preparation which contains a dispersing agent and finely divided dyestuff in such a form that on dilution of the dyestuff preparations with water a fine dispersion is produced. Dyestuff preparations can be obtained in known manner, for example by grinding the dyestuff dry or wet with the addition of textile auxiliaries, for example dispersants, during the grinding process, or by grinding with solvents, such as sulpholane or dimethyl formamide.

In order to achieve intense dyeings on polyethylene terephthalate fibres, it proves advisable to add a swelling agent to the dyebath, or to carry out the dyeing process under pressure at temperatures above 100°C, for example at 120°C. Suitable swelling agents are aromatic carboxylic acids, for example salicylic acid, phenols, such as, for example, o- or p-hydroxydiphenyl, aromatic halogen compounds, such as o-dichlorobenzene, or diphenyl.

For thermofixing the dyestuff, the padded polyester fabric is heated, appropriately after prior drying, for example in a warm stream of air, to temperatures of above 100°C, for example between 180 and 210°C.

The dyeings obtained according to the present process can be subjected to an after-treatment, for example by heating with an aqueous solution of a non-ionic detergent.

Instead of being applied by impregnation, the compounds indicated can, according to the present process, also be applied by printing. For this purpose, for example, a printing ink is used which contains the finely disperse dyestuff in addition to the auxiliaries customary in printing, such as wetting agents and thickeners.

Furthermore, it is possible, for example, to dye in organic solvent liquors, such as a mixture of perchloroethylene and dimethylformamide.

The present process yields strong dyeings and prints of good fastness properties, especially good fastness to thermofixing, sublimation, pleating, exhaust gases, cross-dyeing, dry cleaning, chlorine and wet treatments, such as fastness to water, washing and perspiration. The very high melting points of the new compounds, which permit easier conditioning as dyestuffs, should also be highlighted.

The new water-insoluble compounds can also be used for spin-dyeing polyamides, polyesters and polyolefines. The polymer to be dyed is appropriately mixed in the form of powder, granules or chips, as a ready-to-use spinning solution or in the fused state, with the dyestuff, which is introduced in the dry state or in the form of a dispersion or solution in a solvent, which may be volatile. After homogeneous distribution of the dyestuff in the solution or melt of the polymer, the mixture is converted into fibres, yarns, monofilaments, films and the like in a known manner, by casting, pressing or extrusion.

In the examples which follow, the parts, unless otherwise state, denote parts by weight and the percentages denote percentages by weight.

EXAMPLE 1

5.7 Parts of N-β-cyanoethyl-N-β-hydroxyethyl-aniline are dissolved in 30 parts by volume of pyridine. A slight excess of α-chlorophenylacetic acid chloride is added dropwise at 0° to 10°C, the mixture is stirred for a time, taken up in benzene and the benzene solution is washed with water. Upon removal of the solvent a product of the formula

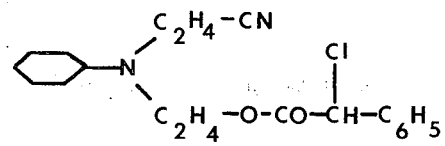

is obtained.

8.15 Parts of 2-cyano-4-nitro-aniline are diazotised in nitrosylsulphuric acid. The diazo solution is added dropwise at 0°C to a solution of 17 parts of the above coupling component in 200 parts by volume of 80% acetic acid. Upon completion of the coupling, the dyestuff is precipitated, filtered off, washed and dried in vacuo, to yield a product of the formula

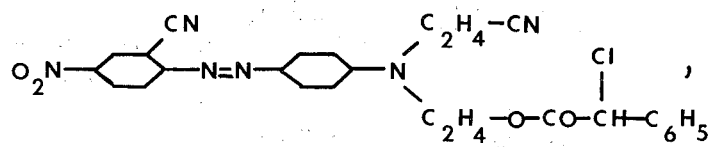

which dyes acetate and polyester fibres in red shades possessing good fastness properties.

If the diazonium compounds of the diazo components listed in column I of the table below are coupled with the coupling components listed in column II, dyestuffs are obtained which dye poyester fibres in the shades indicated in column III. "PA" denotes that the shade is indicated on polyamide and "CA" on cellulose acetate.

| | I | II | III |
|---|---|---|---|
| 1 | 2-Chlor-4-nitro-aniline | ⌬—N(C₂H₄—CN)(C₂H₄—O—CO—CH(Cl)—C₆H₅) | scarlet on PA |
| 2 | 2-Chloro-4-methyl-sulphonylaniline | ⌬—N(C₂H₅)(C₂H₄—O—CO—CH(Cl)—C₆H₅) | orange yellow |
| 3 | 2-Trifluoromethyl-4-chloro-aniline | ⌬—N(CH₂—C₆H₅)(C₂H₄—O—OC—CH(Cl)—C₆H₅) | yellow |
| 4 | 2,5-Dimethoxy-4-cyano-aniline | ⌬—N(C₂H₄—COOCH₃)(C₂H₄—O—CO—CH(Cl)—C₆H₅) | orange |
| 5 | 4-Amino-sulphonyl-aniline | ⌬—N(C₂H₄—OCH₃)(C₂H₄—O—CO—CH(Cl)—C₆H₅) | yellow |
| 6 | 2-Aminoterephthalic acid dimethyl ester | ⌬—N(C₂H₄—O—CO—O—C₂H₅)(C₂H₄—O—CO—CH(Cl)—C₆H₅) | reddish-yellow |

-continued

| | I | II | III | |
|---|---|---|---|---|
| 7 | 2,4-Diethoxy-aniline | Ph-N(C$_2$H$_4$-CN)(C$_3$H$_6$-O-CO-CH(Cl)-C$_6$H$_5$) | yellow on CA | |
| 8 | 4-Methylsulphonyl-aniline | Ph-N(CH$_3$)(C$_2$H$_4$-O-CO-CH(Cl)-C$_6$H$_5$) | yellow | |
| 9 | 2-Cyano-4-nitro-6-bromaniline | Ph-N(C$_2$H$_4$-O-C$_2$H$_4$-CN)(C$_2$H$_4$-O-CO-CH(Cl)-C$_6$H$_5$) | violet | |
| 10 | 2-Phenoxy-4-nitro-aniline | Ph-N(C$_3$H$_6$-NH-CO-NH-C$_2$H$_5$)(C$_2$H$_4$-O-CO-CH(Cl)-C$_6$H$_5$) | red | |
| 11 | 2-Amino-6-acetyl-amino-benzthiazole | Ph-N(C$_2$H$_4$-O-CO-CH$_3$)(C$_2$H$_4$-O-CO-CH(Cl)-C$_6$H$_5$) | red | |
| 12 | 4-Nitro-aniline | Ph-N(C$_2$H$_4$-CN)(C$_2$H$_4$-O-CO-CH(Cl)-C$_6$H$_5$) | orange | |
| 13 | 2-Cyano-4-chloro aniline | " | orange yellow on PA | |
| 14 | p-nitro-aniline | (3-CH$_3$-C$_6$H$_4$)-N(C$_2$H$_4$-O-CO-CH(Cl)-C$_6$H$_5$)$_2$ | reddish orange on CA | |
| 15 | 2-Chloro-4-nitro-aniline | (3-CH$_3$-C$_6$H$_4$)-N(C$_2$H$_4$-O-CO-CH(Cl)-C$_6$H$_5$)$_2$ | red | |
| 16 | 2-Cyano-4-chloro-aniline | " | orange | |
| 17 | 2-Cyano-4-nitro-aniline | " | bluish red | |
| 18 | 4-Nitro-aniline | Ph-N(C$_2$H$_4$-O-CO-CH(Cl)-C$_6$H$_5$)$_2$ | orange on CA | |
| 19 | 2-Chloro-4-nitro-aniline | Ph-N(C$_2$H$_4$-O-CO-CH(Cl)-C$_6$H$_5$)$_2$ | red | |

-continued

| | I | II | III |
|---|---|---|---|
| 20 | 2-Cyano-4-nitro-aniline | " | bluish red |
| 21 | 2-Cyano-4-chloro-aniline | " | yellowish orange |
| 22 | 2-Amino-6-β-cyano-ethyl-sulphonyl-benzthiazole | ⌬(NH-COCH₃)-N(C₂H₅)(C₂H₄-O-CO-CHCl-C₆H₅) | bluish red |
| 23 | 2-Cyano-4-chloro-aniline | ⌬(NH-CO-OC₂H₅)-N(C₂H₄-O-CO-CHCl-C₆H₅)(C₂H₄-O-CO-CHCl-C₆H₅) | red on PA |
| 24 | 2-Amino-6-β-cyano-ethylmercapto-benzthiazole | ⌬(NH-CO-NHCH₃)-N(C₂H₅)(C₂H₄-O-CO-CHCl-C₆H₅) | red on PA |
| 25 | 3-Amino-5-nitro-6-bromo-benziso-thiazole | ⌬(Cl)-N(C₂H₄-CN)(C₂H₄-O-CO-CHCl-C₆H₅) | blue |
| 26 | 3-Amino-5-nitro-benzisothiazole | ⌬(OCH₃)-N(C₂H₄-CN)(C₂H₄-O-CO-CHCl-C₆H₅) | blue |
| 27 | 3-Amino-benziso-thiazole | ⌬-N(C₂H₄-CN)(C₂H₄-O-CO-CHCl-C₆H₅) | reddish violet |
| 28 | 3-Amino-5,7-di-bromo-benziso-thiazole | ⌬(CH₃)(OCH₃)-N(C₂H₅)(C₂H₄-O-CO-CHCl-C₆H₅) | blue |
| 29 | 3-Amino-5-chloro-benzisothiazole | ⌬(NH-CO-CH₃)-N(C₂H₅)(C₂H₄-O-CO-CHCl-C₆H₅) | blue |
| 30 | 3-Amino-5-chloro-7-bromo-benziso-thiazole | ⌬-N(C₂H₄-CN)(C₂H₄-O-CO-CHCl-C₆H₅) | bluish violet |

-continued

| | I | II | III | |
|---|---|---|---|---|
| 31 | 2-Amino-5-nitro-thiazole | 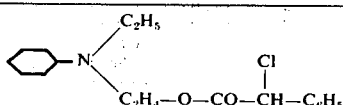 | | violet |
| 32 | 3-Phenyl-5-amino-1,2,4-thiadiazole | 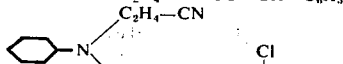 | | yellowish red |
| 33 | 2-Cyano-4-nitro aniline | 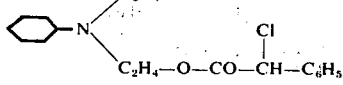 | | violet |

EXAMPLE 2

18 Parts of acetylmandelic chloride are added dropwise at 15° to 20°C to 5.7 parts of N-2-cyanoethyl-N-2-oxyethyl-aniline dissolved in 30 parts by volume of pyridine. The reaction mixture is stirred for 4 hours at room temperature, then for 1 hours at 60°C, poured at room temperature on water, and taken up in benzene. The benzene phase is washed with water, dried with Na₂SO₄ and the benzene distilled off, to leave as residue 10 parts of the compound of the formula

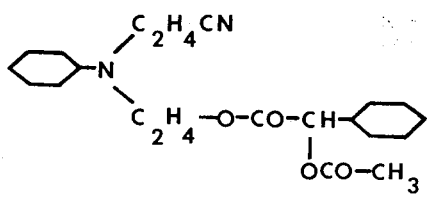

1.2 Parts of 2-cyano-4-nitroaniline are diazotosed in the conventional manner and the diazo solution is coupled in a mixture of glacial acetic acid/propionic acid to 2.7 parts of the above product. The coupling mixture is stirred overnight at 0° to 10°C and precipitation is effected with ice water. The precipitate is filtered and dried to yield the dyestuff of the formula

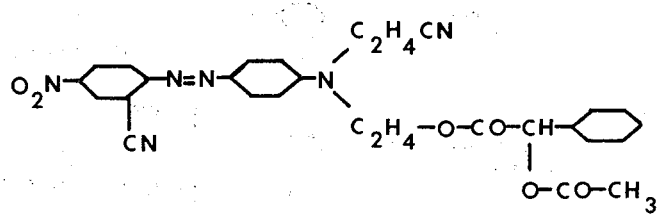

which dyes polyester in red shades possessing outstanding fastness properties, in particular very good fastness to sublimation.

The following table lists further dyestuffs which are obtained in like manner if the diazo compound of the compound listed in column I is coupled to the coupling components listed in column II.

| | I | II | III | |
|---|---|---|---|---|
| 1 | 2-Cyano-4-nitro-aniline | 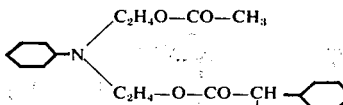 | | bluish red |
| 2 | " | 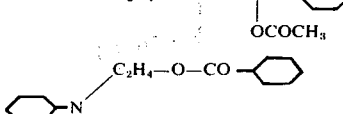 | | " |
| 3 | " | 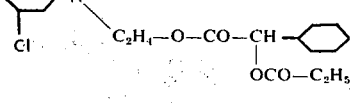 | | red |

-continued

| | I | II | III |
|---|---|---|---|
| 4 | 2-Chloro-4-nitro-aniline | Ph(CH$_3$)–N(C$_2$H$_4$–CN)(C$_2$H$_4$–O–CO–C(–C$_6$H$_5$)$_2$(OCO–CH$_3$)) | red |
| 5 | " | Ph–N(C$_2$H$_4$–CN)(C$_2$H$_4$–O–CO–CH(C$_6$H$_5$)(OCO–C$_6$H$_5$)) | yellowish red |
| 6 | 2,4-Dinitro-6-bromaniline | Ph(OCH$_3$)(NH–CO–C$_2$H$_5$)–N–(C$_2$H$_4$–O–CO–CH(C$_6$H$_5$)$_2$(O–CO–CH$_3$)) | navy blue |
| 7 | 2-Amino-5-nitro-anthranilic acid methyl ester | Ph–N(C$_3$H$_7$)(C$_2$H$_4$–O–CO–CH(C$_6$H$_5$)(O–CO–C$_6$H$_5$)) | red |
| 8 | 2-Chloro-4-nitro-aniline | Ph–N(C$_2$H$_5$)(C$_2$H$_4$–O–CO–CH(OCH$_3$)(C$_6$H$_5$)) | red |
| 9 | 2-Chloro-4-nitro-aniline | Ph–N(C$_2$H$_5$)(C$_2$H$_4$–O–CO–CH(OC$_6$H$_5$)(C$_6$H$_5$)) | red |
| 10 | 3-Amino-5-chloro-7-bromobenziso-thiazole | Ph–N(C$_2$H$_4$–CN)(C$_2$H$_4$–O–CO–CH(C$_6$H$_5$)(OCOCH$_3$)) | bluish violet |
| 11 | 3-Amino-5-chloro-benzisothiazole | Ph–N(C$_2$H$_5$)(C$_2$H$_4$–O–CO–CH(C$_6$H$_5$)(OCOC$_6$H$_5$)) | violet |
| 12 | 3-Amino-5,7-di-bromobenziso-thiazole | Ph–N(C$_3$H$_7$)(C$_2$H$_4$–O–CO–CH(C$_6$H$_5$)(OCOCH$_3$)) | bluish violet |
| 13 | 3-Amino-benziso thiazole | Ph–N(C$_2$H$_4$–CN)(C$_2$H$_4$–O–CO–C(–C$_6$H$_5$)$_2$(Cl)) | reddish violet |
| 14 | 3-Amino-5-nitro-benzisothiazole | Ph(CH$_3$)–N(CH$_3$)(C$_2$H$_4$–O–CO–C$_6$H$_5$(OCOCH$_3$)) | blue |

-continued

| | I | II | III | |
|---|---|---|---|---|
| 15 | | 3-Amino-5-nitro-7-bromo-benziso-thiazole | 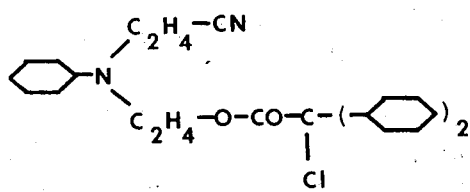 | blue |

EXAMPLE 3

4.0 Parts of N-2-cyanoethyl-N-2-oxyethylaniline are dissolved in 30 parts by volume of pyridine. To this solution are added dropwise 15 parts of diphenyl-chloroacetyl chloride at 0° to 15°C, the mixture is stirred for 1½hours at 0° to 5°C, poured on water, and extracted with benzene. The benzene phase is washed with water, dried with $Na_2SO_4$ and the benzene is evaporated to leave as residue 7.5 parts of the compound of the formula 1 Part of p-nitroaniline is stirred in 70 parts by volume of a mixture of glacial acetic acid/propionic acid (6:1) and 1.8 parts by volume of concentrated HCl and diazotised at 0° to 5°C with 1–8 ml of 4N $NaNO_2$ solution. Water is added and the diazo solution is then coupled to 3.6 parts of the above amine in 20 parts by volume of water. The coupling mixture is stirred overnight at 0° to 5°C, filtered and the residue washed until neutral. The residue is dried to yield 3 parts of the dyestuff of the formula

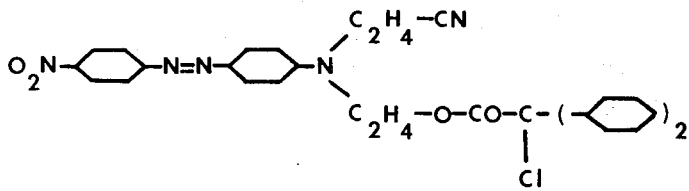

which dyes polyester in strong reddish yellow shades possessing excellent fastness properties.

Dyeing Instruction

1 Part of the dyestuff obtained according to Example 1 is ground wet with 2 parts of a 50% strength aqueous solution of the sodium salt of dinaphthylmethanedisulphonic acid, and the mixture is dried.

This dyestuff preparation is stirred with 40 parts of a 10% strength aqueous solution of the sodium salt of N-benzyl-$\mu$-heptadecyl-benzimidazoledisulphonic acid, and 4 parts of a 40% strength acetic acid solution are added. A dyebath of 4000 parts is prepared therefrom by dilution with water.

100 parts of a cleaned polyester fibre material are introduced into this bath at 50°C, the temperature is raised to 120°–130°C over the course of half an hour, and dyeing is carried out for one hour in a closed vessel at this temperature. Thereafter the material is well rinsed. A powerful red dyeing is obtained which has excellent fastness to light and sublimation.

EXAMPLE 4 a. 5.3 Parts of the dyestuff of the formula

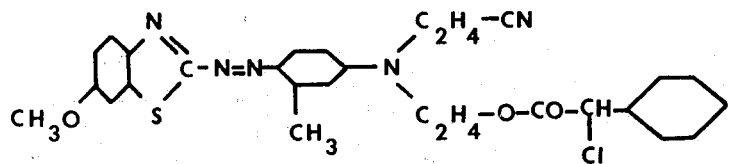

are heated in 100 ml of dimethyl formamide to 80°C and alkylated at this temperature with a slight of dimethyl sulphate. Thereafter the dyestuff is precipitated with ethyl acetate and purified by recrystallisation from water. A dyestuff of the formula

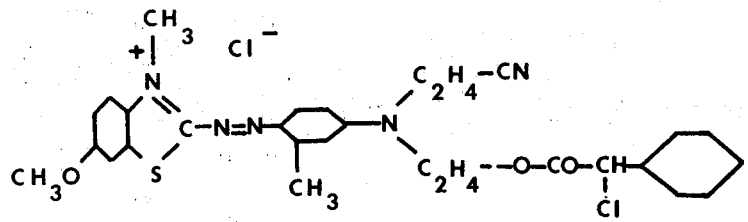

is obtained which dyes polyacrylonitrile fibres in blue shades.

b. The same dyestuff is obtained if 2 parts of 2- hydrazino-3-methyl-6-methoxy-2,3-dihydro-benz-thiazole and 3.4 parts of the coupling component of the formula

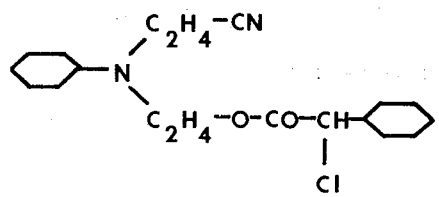

is treated in glacial acetic acid with iron-III-chloride solution.

By diazotising the diazo components listed in column I of the following table, coupling diazonium compounds with the coupling components listed in column II are subsequent quaternisation with dimethyl sulphate or by oxidative coupling of the corresponding hydrazones with the coupling components, dyestuffs are obtained in like manner which dye polyacrylonitrile in the shades indicated in column III.

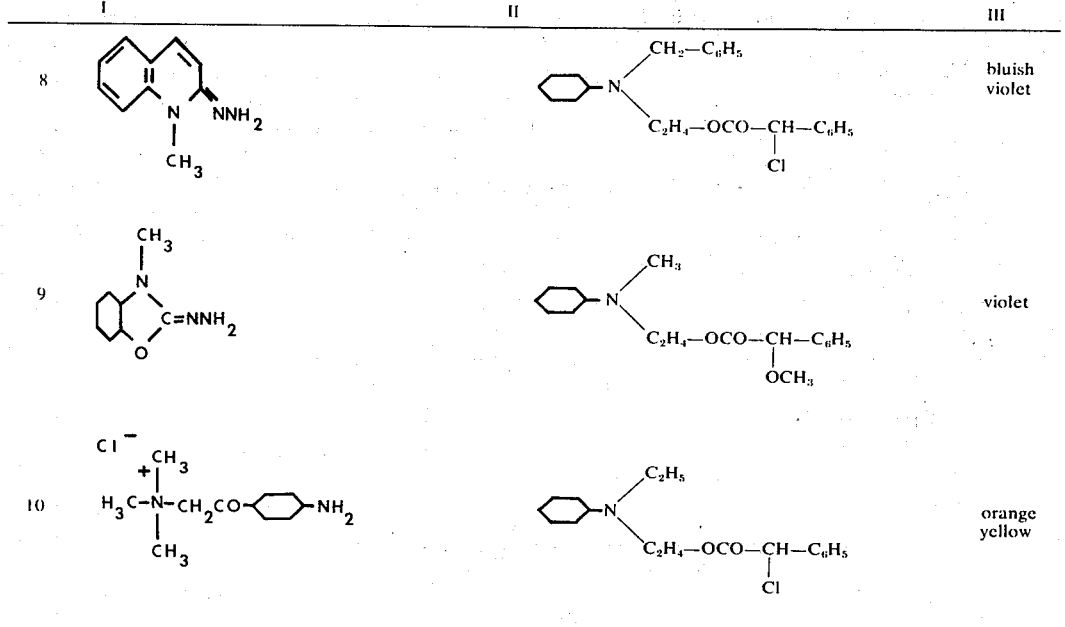

Dyeing Instruction

1 Part of the dyestuff obtained according to Example 4 is dissolved in 5000 parts of water with the addition of 2 parts of 40% acetic acid. 100 Parts of dried yarn from polyacrylonitrile staple fibres are introduced into this dyebath at 60°C. The temperature is raised within half an hour to 100° and dyeing is carried out for 1 hour at this temperature. The dyed goods are then thoroughly rinsed and dried. A blue dyeing possessing very good fastness to light, sublimation and washing is obtained.

What is claimed is:
1. A compound of the formula

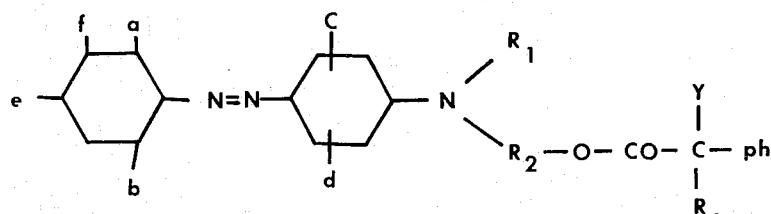

wherein
- $a$ is hydrogen, halogen, alkyl of 1 to 4 carbon atoms, alkoxy of 1 to 4 carbon atoms, nitro, cyano, carbalkoxy wherein the alkoxy group thereof has 1 to 4 carbon atoms, or alkylsulfonyl of 1 to 4 carbon atoms,
- $b$ is hydrogen, halogen, alkyl of 1 to 4 carbon atoms, cyano or trifluoromethyl,
- $e$ is nitro, cyano, carbalkoxy wherein the alkoxy group thereof has 1 to 4 carbon atoms, sulfonamido, N-$C_1$-$C_4$-alkylated sulfonamido, or alkylsulfonyl of 1 to 4 carbon atoms,
- $f$ is hydrogen, halogen, carbalkoxy wherein the alkoxy group thereof has 1 to 4 carbon atoms, or aminocarbonyl,
- $c$ and $d$ independently are hydrogen, $C_1$-$C_2$-alkyl, $C_1$-$C_2$-alkoxy, phenyl, phenoxy, benzyl, phenylethyl or phenylthio, and
- $c$ additionally represents bromo, trifluoromethyl, $C_1$-$C_6$-alkylcarbonylamino, $C_6$-$C_7$-arylcarbonylamino, $C_1$-$C_6$-alkoxycarbonylamino, $C_6$-$C_7$-aryloxycarbonylamino, $C_1$-$C_6$-alkylsulfonylamino, $C_6$-$C_7$-arylsulfonylamino, $C_1$-$C_6$-alkylaminocarbonylamino, $C_6$-$C_7$-arylaminocarbonylamino, formylamino, ureyl or chloroacetylamino,
- $R_1$ is $C_1$-$C_9$-alkyl or $C_1$-$C_9$ alkyl substituted by phenyl, chloro, fluoro, hydroxy, cyano, cyanoethoxy, phenyloxy, phenylmercapto, $C_1$-$C_4$-alkoxy, $C_1$-$C_4$-alkoxy, formyloxy, $C_1$-$C_{18}$-alkylcarbonyloxy, $C_6$-$C_7$-arylcarbonyloxy, formylamido, $C_1$-$C_6$-alkylcarbonylamino, $C_6$-$C_7$-arylcarbonylamino, $C_1$-$C_6$-alkylsulfonyloxy, $C_6$-$C_7$-arylsulfonyloxy, $C_1$-$C_6$-alkylsulfonylamino, $C_6$-$C_7$-arylsulfonylamino, vinylsulfonyl, $C_1$-$C_{18}$-alkoxycarbonylox $C_6$-$C_7$-aryloxycarbonyloxy, $C_1$-$C_{18}$-alkylaminocarbonyloxy, $C_6$-$C_7$-arylaminocarbonyloxy, phenylacetyloxy, cinnamoyloxy, oleyloxycarbonyloxy, oleylaminocarbonyloxy, cyclohexylcarbonyloxy, or benzyloxycarbonyloxy,
- $R_2$ is $C_1$-$C_4$-alkylene which is unsubstituted or substituted by chloro, bromo or hydroxy,
- Y is halo, phenoxy, $C_1$-$C_4$-alkoxy, formyloxy, $C_1$-$C_4$-alkylcarbonyloxy, $C_1$-$C_4$-alkoxycarbonyloxy or $C_1$-$C_4$-alkylaminocarbonyloxy, and
- $R_3$ and ph are independently phenyl or phenyl substituted by nitro, chloro, bromo, $C_1$-$C_2$-alkoxy or $C_1$-$C_2$-alkyl, and
- $R_3$ additionally represents hydrogen.

2. A dyestuff of the formula

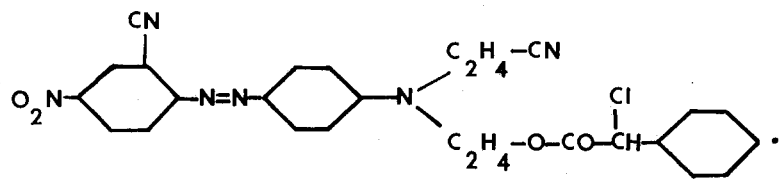
3. A dyestuff of the formula
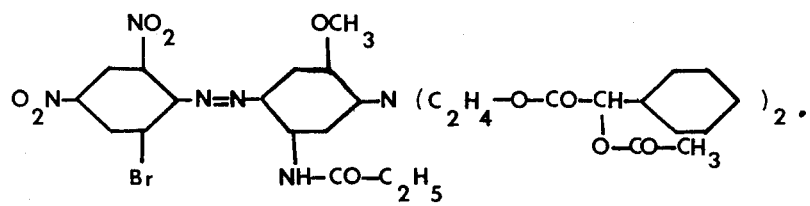
4. A dyestuff of the formula
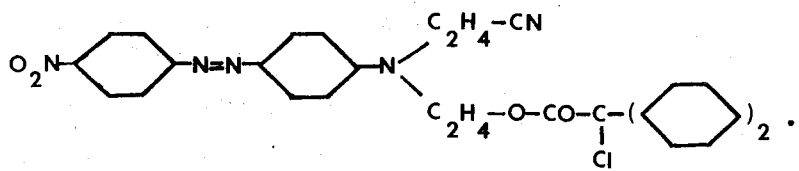
5. A dyestuff of the formula
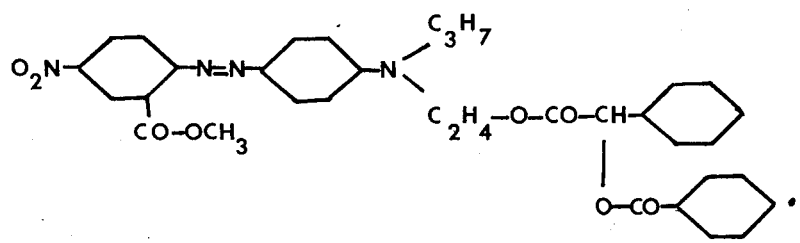
* * * * *